(12) United States Patent
Ketcham (10) Patent No.: US 6,721,334 B1
(45) Date of Patent: Apr. 13, 2004

(54) METHOD AND APPARATUS FOR PACKET AGGREGATION IN PACKET-BASED NETWORK

(75) Inventor: Carl Ketcham, Taylorsville, UT (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/252,128

(22) Filed: Feb. 18, 1999

(51) Int. Cl.[7] .................................................. H04J 3/24
(52) U.S. Cl. ........................ 370/473; 370/465; 370/474; 370/477
(58) Field of Search ................................. 370/474, 476, 370/401, 469, 465, 473, 477, 356, 392

(56) References Cited

U.S. PATENT DOCUMENTS

| | | | | |
|---|---|---|---|---|
| 4,312,065 A | * | 1/1982 | Ulug ........................... 370/230 |
| 5,555,241 A | * | 9/1996 | Lazaridis et al. ............ 370/401 |
| 5,719,858 A | * | 2/1998 | Moore ......................... 370/347 |
| 5,754,768 A | * | 5/1998 | Brech et al. .............. 395/200.6 |
| 5,883,891 A | * | 3/1999 | Williams et al. ............ 370/356 |
| 6,094,671 A | * | 7/2000 | Chase et al. ................ 709/201 |
| 6,101,188 A | * | 8/2000 | Sekine et al. ............... 370/401 |
| 6,115,422 A | * | 9/2000 | Anderson et al. ........... 370/240 |
| 6,240,140 B1 | * | 5/2001 | Lindbergh et al. .......... 375/260 |
| 6,336,129 B1 | * | 1/2002 | Ise et al. ..................... 709/201 |
| 6,385,170 B1 | * | 5/2002 | Chiu et al. .................. 370/235 |
| 6,400,686 B1 | * | 6/2002 | Ghanwani et al. .......... 370/232 |
| 6,407,994 B1 | * | 6/2002 | Archer ......................... 370/351 |
| 6,408,001 B1 | * | 6/2002 | Chuah et al. ................ 370/392 |
| 6,438,137 B1 | * | 8/2002 | Turner et al. ................ 370/466 |
| 6,449,279 B1 | * | 9/2002 | Belser et al. ................ 370/397 |
| 2001/0005404 A1 | * | 6/2001 | Resnikoff et al. ........... 375/350 |
| 2001/0028653 A1 | * | 10/2001 | Endo et al. .................. 370/397 |

\* cited by examiner

*Primary Examiner*—Chi Pham
*Assistant Examiner*—Anh-Vu H. Ly
(74) *Attorney, Agent, or Firm*—McDonnell Boehnen Hulbert & Berghoff (57) ABSTRACT

A system and method for improving the efficiency of a packet-based network by using aggregate packets are described. One example method involves determining which network devices support aggregate packets. If a first packet is received on a route that supports aggregate packets, it is then held for a short period. During this short period, if an additional packet is received that shares at least one common route element that also supports aggregate packets with the first packet, the first packet and the additional packet are combined into a single larger aggregate packet. This can reduce the transmission time when there are multiple packets being sent to common destinations because the inter-packet time may be reduced. Additionally, in some networks, this technique allows the bandwidth of a common medium to be more fully used because more of the packets will be closer to the maximum size allowed.

34 Claims, 7 Drawing Sheets

METHOD AND APPARATUS FOR PACKET AGGREGATION IN PACKET-BASED NETWORK

BACKGROUND OF THE INVENTION

1. Field of the Invention

This invention relates to the field of packet-based networks. In particular, the invention relates to techniques for improving the efficiency of packet-based networks.

2. Description of the Related Art

Figure 1:
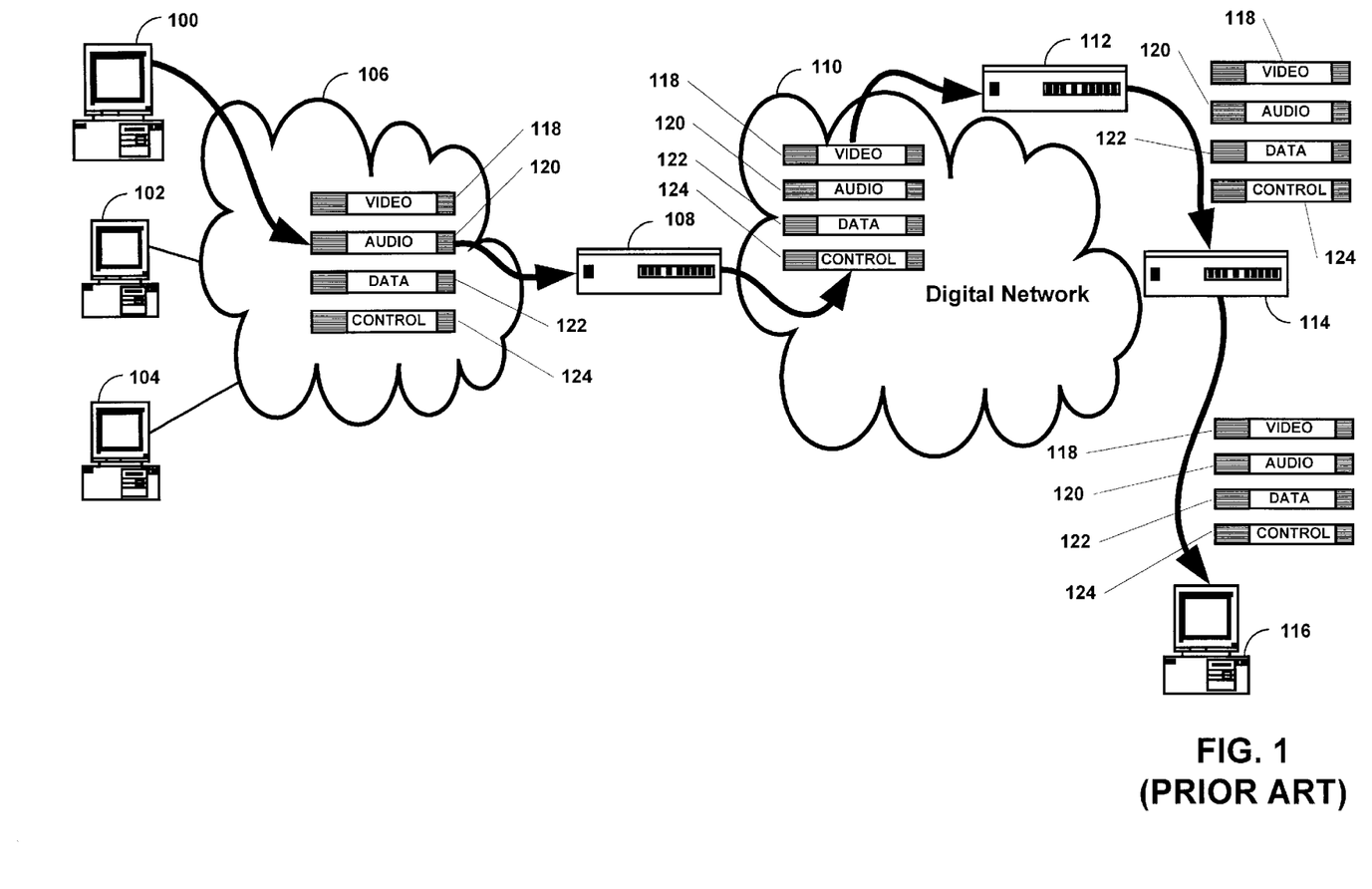
FIG. 1 illustrates a typical prior art configuration of a local area network coupled to a digital network with stations supporting multimedia conferencing.

The prior art techniques for packet based networks are shown by FIG. 1. One or more terminals 100–104 are coupled in communication in a network 106. A router 108 couples the network 106 with a, typically larger, network 110 such as the Internet, a corporate wide area network (WAN), or some other type of packet-based network. The network 110 is in turn coupled to routers, gateways, bridges, and other connecting devices such as the router 112. The router 112 is coupled to the router 114 which is coupled to the terminal 116.

FIG. 1 shows a prior art network built upon the Ethernet protocol. The Ethernet protocol is an umbrella term for a group of protocols that have been standardized by the Institute of Electrical and Electronics Engineers (IEEE) under standards documents 802.3x. The "x" refers to the various protocols that fall under the umbrella term Ethernet such as IEEE 802.3, standard 10 Mbps Ethernet; IEEE 802.3u, Fast Ethernet; IEEE 802.3z, Gigabit Ethernet; and other Ethernet protocols. Ethernet networks are just one type of packet-based network that is widely used.

In a packet based network, data is transmitted in packets, also called frames. In this example, there are four packets 118–124 being transmitted from the terminal 100 to the terminal 116. The packets 118–124 shown in FIG. 1 comprise video information, packet 118; audio information, packet 120; data information, packet 122; and control information, packet 124. These four packet types are common under the H.323 protocol for packet-based multimedia conferencing. Under the H.323 protocol, the network protocol used is IP and the transport protocol used is the user datagram protocol (UDP). The payload 216 of each of the packets 118–124 contains the different data types. The UDP protocol is used in favor of the transmission control protocol (TCP) in packet-based multimedia conferencing because TCP supports dropped packet recovery, an unnecessary feature for multimedia conferencing.

Figure 2:
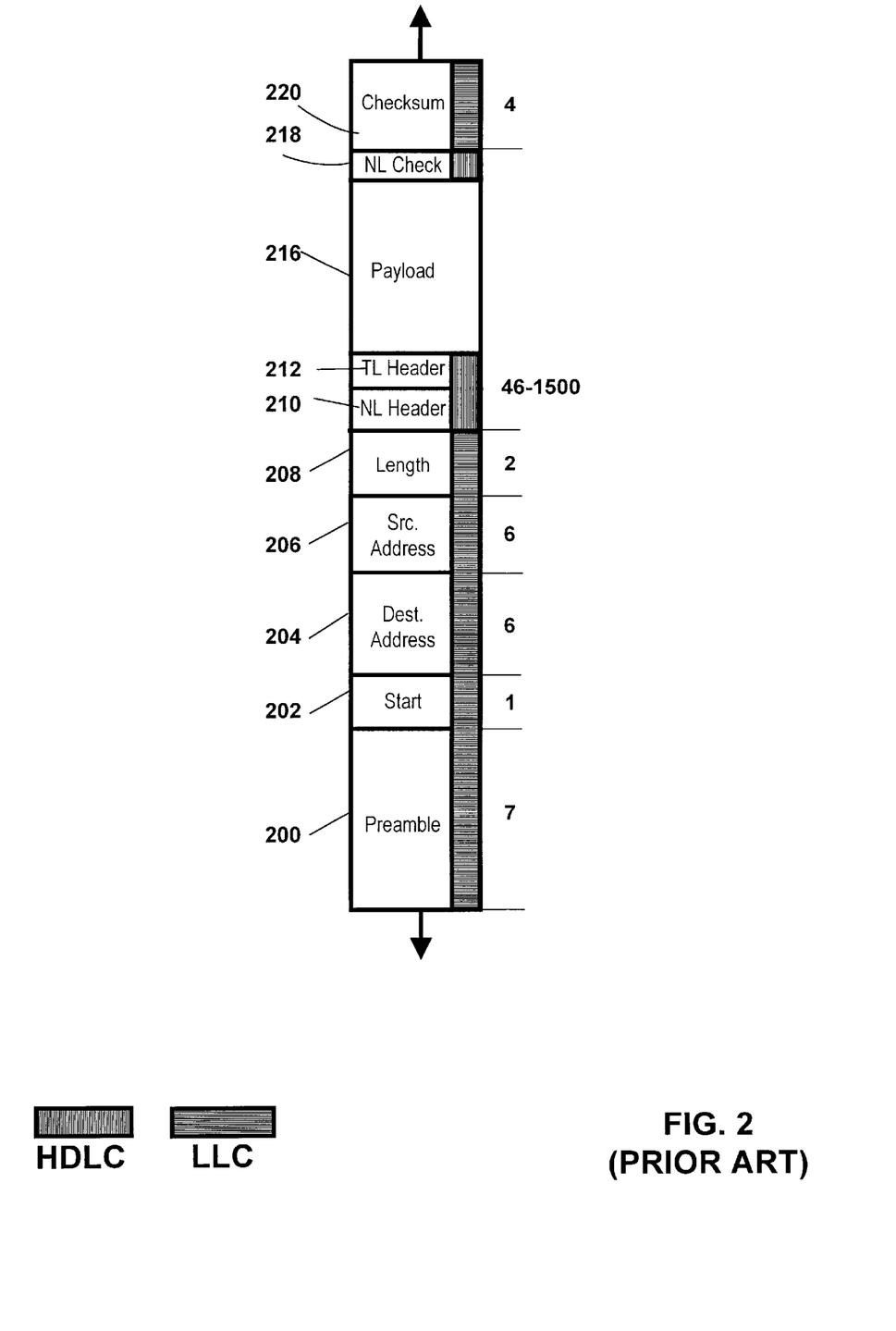
FIG. 2 is a diagram of a prior art packet compliant with a standard 10 Mbps Ethernet protocol.

It is typical to describe the components of a packet using terminology that designates different terms for different components of the data. In an IEEE 802.3x network, the packet comprises a number of different components as shown by FIG. 2. The elements can loosely be divided into two categories: the link layer control (LLC) components 200–208 and 220 and the high-level data link control (HDLC) components 210–218. This differentiation allows an Ethernet network to carry different types of network protocol traffic. The LLC components are mandatory components irrespective of the network protocol, such as Internet Protocol (IP), being used.

In the prior art, each of the four packets 118–124 that might be generated in the multimedia conference are transmitted separately over the network. This is also true generally of networks using IEEE 802.3x, each packet is a discrete unit with distinct HDLC components specifying different network protocol and transport protocol destinations even if the LLC destination address 204 is the same.

As shown in FIG. 2, the payload 216, including the HDLC components 210–212 and 218, can accommodate a maximum of 1500 bytes of data. Thus, if the network layer header 210 for IP is 20 bytes and the transport layer header 212 for UDP is 8 bytes, then only 1500–20–8, or 1472, bytes are available for payload in each packet. Additionally, each packet includes a seven byte preamble 200, the one byte start flag, a six byte LLC destination address 204, a six byte LLC source address 206, a two byte length 208, and a four byte checksum 220. The two byte length 208 indicates how many bytes the HDLC components 210–218 are. Adding these byte sizes makes the maximum packet size at most 1526 bytes for an IEEE 802.3 network, standard 10 Mbps Ethernet.

If the actual size of most packets is significantly less than the maximum size, the network is not operating at maximum efficiency. This is because Ethernet is a carrier sense multiple access (CSMA) protocol with collision detection (CD). The transmission times are setup based on the maximum packet size and a maximum cable length. Contention periods for access to the common transmission medium are placed in between the packet transmission slots. This means that the packet sizes for higher speed Ethernet protocols are larger, or the maximum cable length must be shortened. Additionally, the contention period between transmission of successive packets adds another delay to the transmission of data. On an IEEE 802.3, standard 10 Mbps Ethernet, the per packet overhead is 20.8 $\mu$sec and there is a minimum 9.6 $\mu$sec gap between packets.

If all four packets 118–124 are transmitted according to the prior art, there will be at least a 36 $\mu$sec of delay introduced to transmit all of the packets. Therefore, it is desirable to have a network which can reduce these delays.

SUMMARY OF THE INVENTION

A method for creating an aggregate packet in a packet-based network is described. The method includes receiving a packet over the network. Examining the route for the packet to see if the route supports aggregate packets. If the route supports aggregate packets, starting a timer to wait a predetermined period.

In one embodiment, if no packets suitable for creating an aggregate packet are received before the timer expires, the packet is sent normally through the packet-based network. In one embodiment, the timer is set to wait 10 msec.

When another packet is received over the network, the route of the packet is etermined. If the route shares at least one common destination with the first packet and that destination supports aggregate packets, an aggregate packet is created including the first packet and the second packet.

This method can be used over a variety of different types of packet-based network including non-IEEE 802.3x networks such as home networks and wireless networks.

When the packets are aggregated into an aggregate packet, some link layer control information may be removed. This might include the preamble and the start from an IEEE 802.3 packet. In some embodiments, it might also include removing the LLC destination address and source address if all of the packets in an aggregate packet have the same source and destination.

The aggregate packet can include more than just two packets. The number of packets embedded in an aggregate packet is limited primarily by the maximum packet size on the packet-based network. On an IEEE 802.3 packet-based network where the maximum packet size is 1526 bytes, typically no more than approximately four packets can be embedded in a single aggregate packet.

In one embodiment, each aggregate packet includes a fixed sized table that describes the locations and size of the embedded packets. This embodiment with a table with only four entries may be well suited to an IEEE 802.3 network especially if H.323 multimedia conferencing is a common application.

In other packet-based networks with larger maximum packet sizes, a variable amount of header data may be more desirable. In this embodiment, a count of the number of embodiments is provided followed by that number of location and size value pairs describing the embedded packets in the aggregate packet.

A method for determining which network devices support aggregate packets is also described. The method involves sending a probe packet to a network device. A timer is then set to wait for a response packet. If a response packet is returned before the timer expires, then the sender will record that the network device supports aggregate packets. Otherwise, it is assumed that the network device does not support aggregate packets.

The probe packets can be specially formatted to be detectable by network devices that support aggregate packets.

The response packets can be specially formatted to be detectable by network devices that support aggregate packets.

In some embodiments, a computer data signal embodied in a carrier wave includes a computer program for supporting aggregate packets. In one embodiment, the computer program is adapted for a multimedia communication device. In one embodiment, the audio and video packets from the multimedia communication device are automatically aggregated together if the receiving terminal supports aggregated packets.

DETAILED DESCRIPTION

A. System Overview

The transmission delays inherent in many packet based protocols can reduce application performance. A solution to this problem is to reduce the number of delays spent due to CSMA/CD contention periods by creating aggregate packets. The aggregate packets will contain multiple packets that would normally have had to be transmitted over several different transmission periods in the packet-based network. In one embodiment, aggregate packets are supported in a fashion to be compatible with existing systems on the packet-based network. Accordingly, it is necessary to set up routes on the network for packet aggregation.

Figure 3:
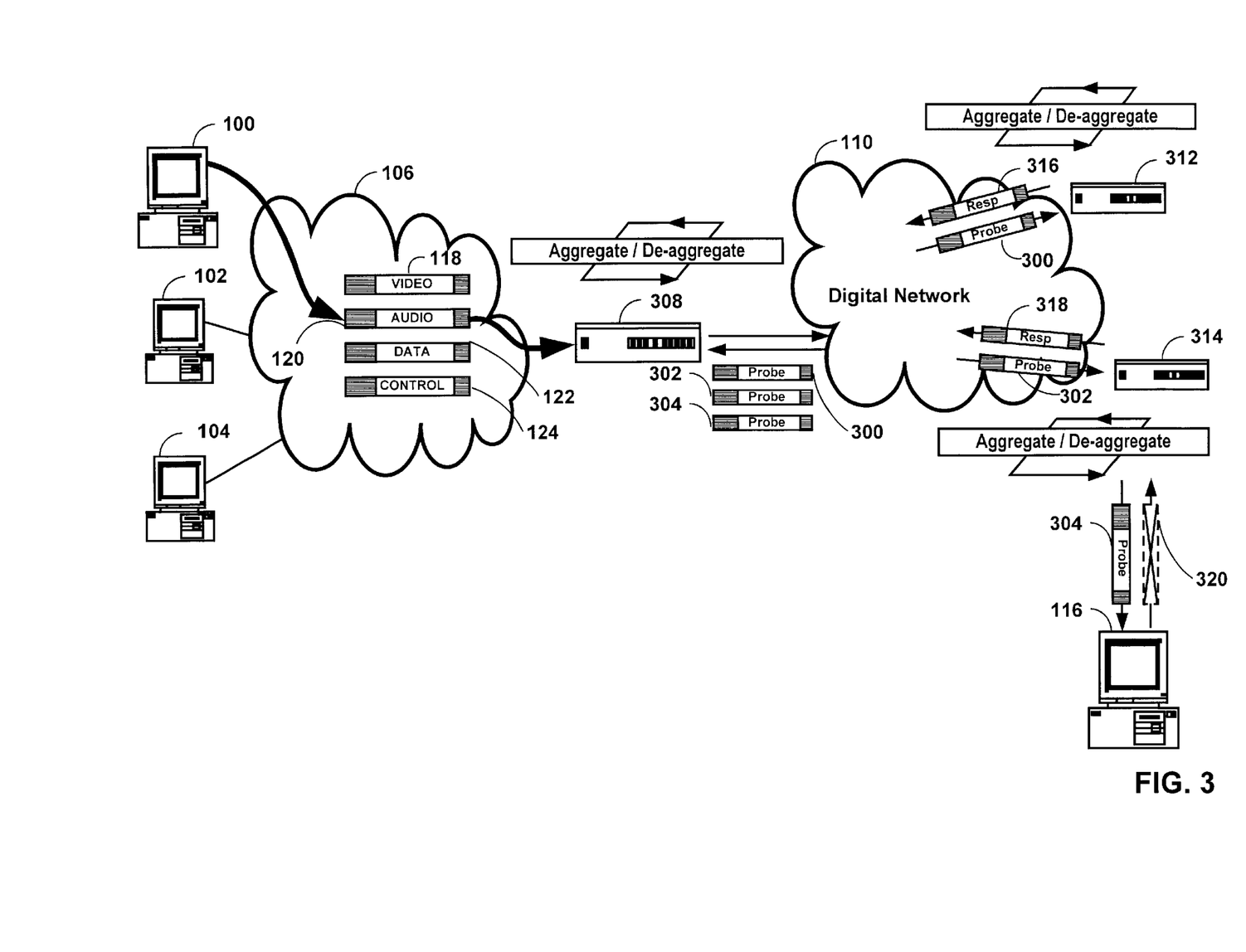
FIG. 3 illustrates the packet aggregation setup phase accomplished by probing network routes to determine which devices on the network support aggregate packets.

FIG. 3 illustrates the packet aggregation setup phase accomplished by probing network routes to determine which devices on the network support aggregate packets. The network of FIG. 3 includes devices that support aggregate packets according to one embodiment of the invention.

The following paragraph lists the elements of FIG. 3. FIG. 3 includes the tenrninals 100–104, the network 106, a router 308, the network 110, a router 312, a router 314, and the terminal 116. FIG. 3 includes the packets 118–124 being transmitted from terminal 100 to terminal 116. FIG. 3 includes probe packets 300–304, response packets 316–318, and a lack of a response packet 320.

The following paragraph lists the interconnections between the elements of FIG. 3. The terminals 100–104 are coupled in communication with the network 106. The network 106 is coupled in communication with the router 308. The router 308 is coupled in communication with the network 110. The network 110 is coupled in communication with the router 312. The router 312 is coupled in communication with the router 314. The router 314 is coupled in communication with the terminal 116.

The following describes the use of the elements of FIG. 3. The terminals 100–104 and 116 could be personal computers, server computers, thin-client computers, video conferencing terminals, multimedia conferencing terminals, H.323 terminals, H.323 multipoint control units, or some other type of terminals. The terminals 100–104 are coupled in communication with the network 106.

The networks 106 and 110 are a packet-based network. The networks 106 and 110 could be wireless networks, a local area networks (LANs), wide area networks (WANs), home networks, the Internet, some other type of packet-based networks, and/or some combination of these networks. In this example, the networks 106 and 110 are IEEE 802.3x networks.

The router 308 is a router that supports aggregate packets. A router is a network device that is capable of routing packets. A router may be a stand-alone device such as the routers 308–312, a software based program running on a personal computer or workstation, or some other type of router. The router 308 is a communication link between the network 106 and the network 110. The router 308 might also translate between different protocols if necessary. This might require modifying the packet format for transmission over a frame relay network using the X.25 protocol. In this example, the network 110 uses the same packet format as the network 106. The routers 312–314 function similarly. In this example, the routers 312–314 do not perform packet format translation. The routers 308–314 could also be switches, bridges, or support some other type of packet access device (PAD) for analyzing packets.

In FIG. 3, no route has yet been set up for aggregate packets. The terminal 100 is sending packets to the terminal 116. In this example, the packets include multimedia conferencing packets according to the H.323 standard. The router analyzes the packets and determines whether the packets need to be transmitted onto the network 110. Since the LLC destination address is not in a route set up for aggregate packets, the router 308 will determine whether any hosts on the route support aggregate packets. Until a route is set up for aggregate packets, the router forwards the packets normally.

The router 308 can set up the route when it sees a new LLC destination address for the first time. This can be done by determining the route the packet will take based on the interior gateway protocol (IGP). Other techniques, such as using a standard traceroute technique can determine the same information. In this example, the route includes the router 312, followed by the router 314, followed by the terminal 116.

The next step includes determining which of the network devices on that route support packet aggregation. This can be done by having the router 308 send probe packets such as the probe packets 300–304.

One probe packet is sent to each network device in the route. In one embodiment, the probe packets are broadcast packets. In one embodiment, the probe packets are non-broadcast packets. The router 308 will to determine if the network device supports aggregate packets by starting a timer for a predetermined response period. In this example, the response period is set to between three and five seconds. This means that if a network device does not send a response packet before the timer expires, the router 308 will assume that the network device does not support aggregate packets. The response period might vary based on network characteristics such as latency, speed, and other factors.

The probe packet 300 is routed over the network 110 to the router 312. In this example, the router 312 supports aggregate packets and sends the response packet 316 to the router 308. When the response packet 316 is received, the router 308 will record that the router 312 supports aggregate packets. Similarly, the probe packet 302 is routed over the network 110 to the router 314, via the router 312. The router 314 supports aggregate packets and sends the response packet 318 to the router 312. When the response packet 318 is received, the router 308 will record that the router 314 supports aggregate packets.

Alternatively, the router 308 can look up which network devices in the route support aggregate packets from a cached store of broadcast messages. In this embodiment, network devices that support aggregate packets periodically send broadcast messages over the network. The broadcast messages can be in the form of response packets. Other network devices that support aggregate packets can store these broadcast messages in a cache for later use.

The terminal 116 does not support aggregate packets, when the probe packet 304 reaches the network adapter in the terminal 116, it is not responded to by the adapter or by any of the higher level software monitoring the packets received. As a result, no response packet is generated 320. When the response period elapses, the router 308 will record that the terminal 116 does not support aggregate packets.

While this setup process occurred, the terminal 100 could continue to send packets such as the packets 118–124 to the terminal 116. Similarly, if the router 308 already had the route set up to support aggregate packets, the packet aggregation method could have been implemented immediately.

The probe packets can specify a timer period, or maximum latency, that the router 308 will hold packets for aggregation. This is the amount of time each packet on a route that supports packet aggregation will be held waiting for another packet for the same destination. The response packet can specify the actual timer, or actual latency, that the other device wants used by the router 308. For example, the maximum latency might be set to ten milliseconds in the probe packet 300, but the response packet 316 might specify an actual latency of five milliseconds. In that case, the router 308 will hold packets for five milliseconds.

The timers might be determined statistically based on network performance characteristics for a destination over a period of time. The timers might be determined based on quality of service commands or settings. In this embodiment, data streams with higher quality of service settings might have short timers. However, data streams with lower quality of service settings might have extended timers.

Because the topology of packet-based networks changes regularly as devices are added and removed, it may be useful to periodically refresh the data about network devices supporting aggregation in the router 308. One approach is to remove network devices from the list after a predetermined period of time, for example 60 sec. Another approach is to remove devices from the list if the device has not been sent an aggregate packet in a predetermined period of time, for example 60 sec. Another approach is to periodically resend probe packets to devices in the list, for example every one to five minutes. All of the times given are examples and might be decreased or increased to adjust performance. For example, if the router has only a small amount of memory for storing information about network devices that support aggregate packets, shorter predetermined periods might be used to ensure that the memory is available for new routes.

In this example, devices are probed to update the packet aggregation data every three minutes. Accordingly, the packet aggregation data in the router 308 could look like Table 1.

TABLE 1

| Device | Agg Packets? | Timer | Last Probed |
| --- | --- | --- | --- |
| router 312 | Y | 5 ms | 39 sec ago |
| router 314 | Y | 10 ms | 1 sec ago |
| terminal 116 | N | N/A | 59 sec ago |

The first entry of Table 1 indicates that the router 312 supports aggregate packets and was last used 39 seconds earlier. If another 21 seconds pass without sending an aggregate packet to the router 312, the entry will be cleared completely. The timer valve of five milliseconds indicates that packets on routes supporting aggregation that use the router 312 will be held for up to five milliseconds before transmission to allow for additional packets to the same final or intermediate destination.

The second entry of Table 1 indicates that the router 314 supports aggregate packets and was last probed one second earlier. In one embodiment, instead of or in addition to tracking the last probed time, the last used time is kept. The last used time is the time elapsed since the device was last sent an aggregate packet. In one embodiment, each time a packet is aggregated and sent, the last used value of the corresponding entry is reset to zero. If a steady stream of packets continues to the router 314, the entry may remain for an extended period. The router 314 supports a longer timer of ten milliseconds.

The final entry of Table 1 indicates that the terminal 116 does not support aggregate packets, a timer can still be maintained so that the entry is removed and can later be refreshed.

It is possible for both the source and destination network devices to support aggregate packets. For example, in FIG. 1, if both the terminal 100 and the terminal 116 supported aggregate packets, terminal 100 could have set up the route to 116 for packet aggregation directly. The support for aggregate packets could be software based or a component of the network interface hardware.

B. Creating and Sending Aggregate Packets

Figure 4:
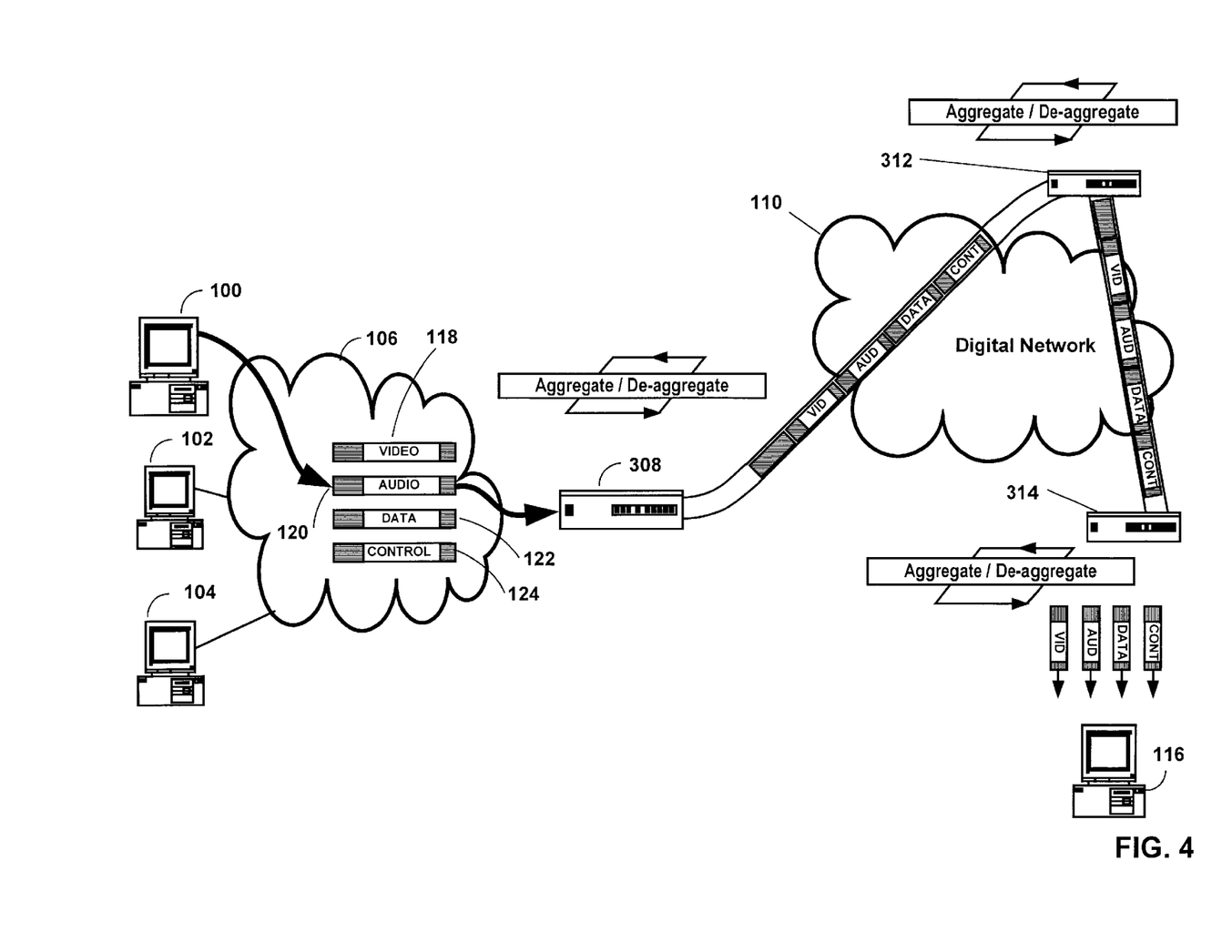
FIG. 4 illustrates the creation and transmission of aggregate packets by devices on a network.

FIG. 4 illustrates the creation and transmission of aggregate packets by devices on a network. This could be the network described in FIG. 3, or some other network which has devices that support aggregate packets.

The following paragraph lists the elements of FIG. 4. FIG. 4 includes the terminals 100–104, the network 106, the router 308, the network 110, the router 312, the router 314, and the terminal 116. FIG. 4 includes the packets 118–124 being transmitted from terminal 100 to terminal 116. FIG. 4 includes the aggregate packet 400.

The following paragraph lists the interconnections between the elements of FIG. 4. The terminals 100–104 are coupled in communication with the network 106. The network 106 is coupled in communication with the router 308. The router 308 is coupled in communication with the network 110. The network 110 is coupled in communication with the router 312. The router 312 is coupled in communication with the router 314. The router 314 is coupled in communication with the terminal 116.

The following describes the use of the elements of FIG. 4. The router 308 has now been set up in the manner described above to support aggregate packets along the route from the terminal 100 to the terminal 116. The information might be recorded internally in the router in a format similar to Table 1.

When the packet 118, containing the audio data, is received, the router 308 looks up the LLC destination address in routing tables. One of the columns in the routing tables indicates whether the route supports aggregate packets. Because the route for the packet 118 includes the routers 312–314, which support aggregate packets as determined by the probe-response process reflected in Table 1, the route would be marked as supporting aggregate packets.

The router 308 will select the longest possible path for the aggregate packet. In this case, that is sending the aggregate packet to the router 314. Looking up the entry for the router 314, a ten millisecond timer should be started. The number of packets combined into a single aggregate packet is limited primarily by the maximum packet size in the network and the timer. Therefore, if additional packets arrive before the timer expires, they can be combined in an aggregate packet with the packet 118 provided that the total size does not exceed the maximum packet size.

Consider the packet 120 which has audio data, the LLC destination address is the same as the LLC destination address for packet 118 which is being held for possible aggregation. If the timer has not expired, the packet 120 can be aggregated with the packet 118. Until the timer expires or the payload of the aggregate packet is full, additional packets can be put into the aggregate packet. If the timer expires before any packets with a shared LLC destination are received, then the packet 118 is transmitted without being aggregated.

If the packet 122 contained a particularly large payload such that it could not be aggregated with the packets 118–120, the packet 122 could be sent by itself and the aggregation process continued until the timer for the packet 118 expired. Alternatively, an aggregate packet comprising the packets 118–120 could be sent while a new timer was started for the packet 120. Alternatively, an aggregate packet comprising the packets 118–120 could be sent and then in the next transmission slot, the packet 122 could be sent.

In this example, the packets 120–124 with the same LLC destination address as the packet 118 arrive before the ten millisecond timer expires on the packet 118. In that case, all of the packets 118–124 can be placed in a single aggregate packet, the aggregate packet 400. This assumes that the packets 118–124 have a total size smaller than the maximum packet size for the packer-based network. The aggregate packet 400 is sent over the network 110 as a single packet taking up a single transmission slot and no contention delays are introduced into the transmission of the packets 118–124.

The router 312 receives the aggregate packet 400. The router 312 supports aggregate packets and detects that the aggregate packet 400 is an aggregate packet with an LLC destination other than the router 312 itself. In this case, the router 312 can either hold the packet for further aggregation or immediately send it on. In one embodiment, aggregate packets are not further aggregated. In one embodiment, the aggregate packet 400 is held according to a timer for further aggregation if the router 312 has setup packet aggregation for packets destined for the router 314.

In this example, the router 312, routes the aggregate packet 314 to the router 314 without attempting further aggregation. The router 314 receives the aggregate packet 400 and detects that the packet is an aggregate packet with an LLC destination of the router 314 itself and so the router 314 de-aggregates the aggregate packet 400 and transmits the packets 118–124 to their destinations. In this example, the packets 118–124 are all sent to the terminal 116.

Aggregatin Packets With Shared Intermediate Destinations

In the example, all of the packets 118–124 shared the same final destination and thus shared the same LLC destination address. It is possible to conduct the aggregation process in a more general fashion.

The following conventions will be used, a route to an LLC destination address will be designated by a sequence of network devices listed as letters between angle brackets, e.g. <A, B, C, D>. This means that the route to network device D goes through A followed by B followed by C. A further convention will be to underline the network devices that support aggregation, e.g. E. This means that the network device E can aggregate and de-aggregate packets.

In the example of FIG. 4, all of the packets shared identical routes and final destinations, in actuality, the technique is more general. Consider a packet X with the route <A, B, C, D, E, F> and the packet Y with the route <A, B, C, D, T, U, V>.

If we followed the approach described for handling the packets 118–124, packet X and packet Y would not be aggregated because they do not share the same LLC destination address, F for packet X and V for packet Y. However, as the routes show, they share many common points during which their transmission could be made in aggregate form.

In this embodiment, a packet is held according to the shortest timer for the route. In this example, if packet X is received first and C, D, and F support aggregation with five millisecond, ten millisecond, and ten millisecond timers respectively, a five millisecond timer will be set. In this embodiment, the target aggregation address is initially selected to be network device F. If however, a packet such as the packet Y is received that shares a path with a packet being held for aggregation such as the packet X, then the longest common path is selected as the new target for aggregation. Here, that would be the network device D. When the five millisecond timer expires for packet X, it together with packet Y would be transmitted as an aggregate packet to network device D.

When the aggregate packet containing the packet X and the packet Y arrives at network device D, there might be a packet Z with a route of <T, U, V> which has a timer for aggregation pending. In that case the packet Y could be aggregated with the packet Z and sent out appropriately.

This sort of switching of packets into and out of different aggregate packets allows the transmission time to be used most effectively by sending packets that are close to the largest allowable size, and by reducing the delay between transmission of many small packets all with a common destination.

C. Structure of a Probe Packet

Figure 5:
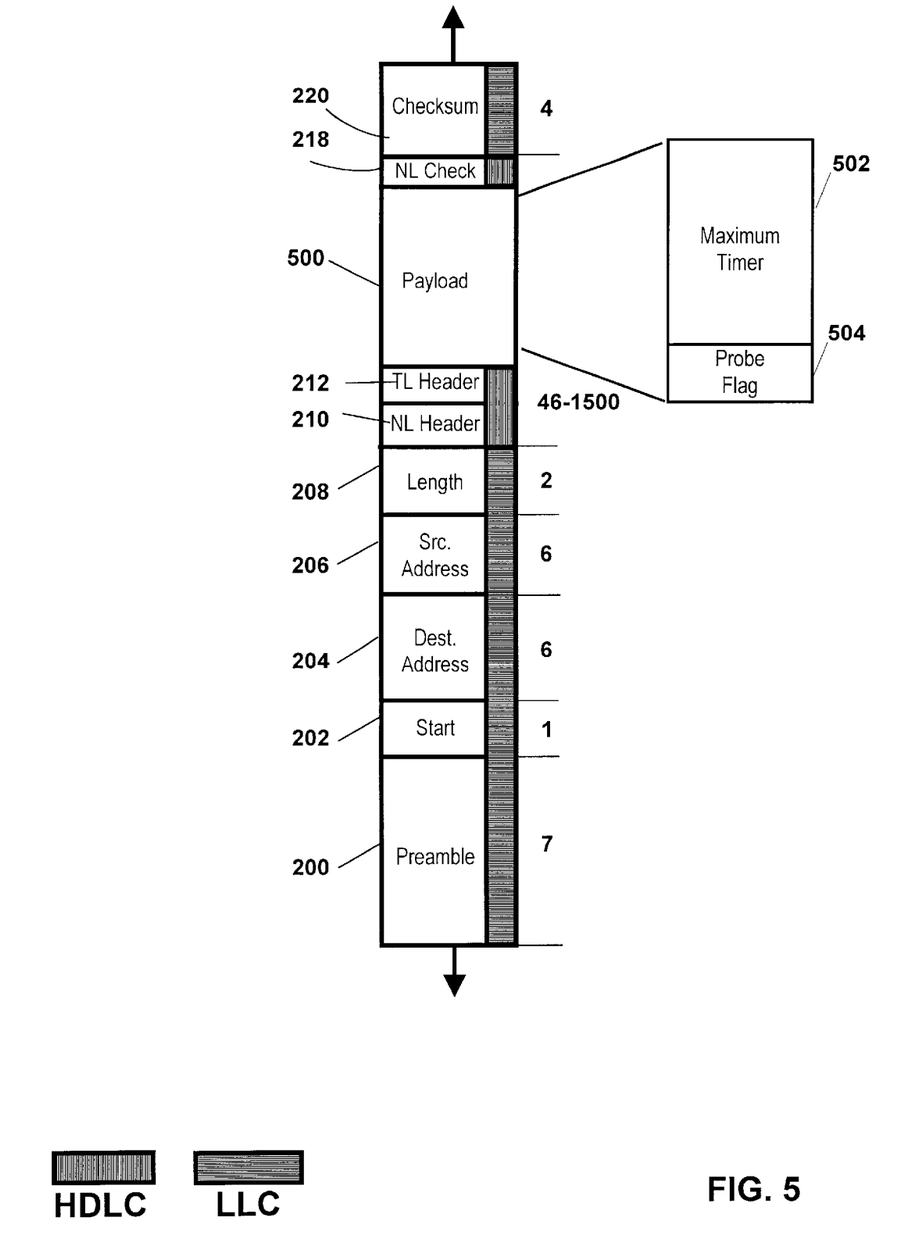
FIG. 5 is a diagram of an example probe packet.

FIG. 5 is a diagram of an example probe packet. This could be used as the probe packets 300–304.

FIG. 5 shows the configuration of the probe packet for an IEEE 802.3 packet-based network. Other configurations could be used on other types of packet-based networks. In one embodiment, the probe packet could be broadcast over the packet-based network.

The structure of the probe packet is similar to the structure of the IEEE 802.3 packet shown in FIG. 2. However, the payload 216 is replaced with a probe payload 500. The probe payload 500 includes a probe flag 504 and a maximum timer 502. The probe flag 504 is a predetermined sequence of one or more bytes designating that the packet is a probe packet. Additionally, the transport layer header component 212 can designate a predetermined port which is used for receiving probe packets. By designating a particular port, the chances that a normal packet would be mistaken for a probe packet can be further reduced.

The maximum timer 504 indicates the maximum hold time that the network device sending the probe packet will accept for use in packet aggregation. In the response packet, the network device that receives the probe packet has a chance to provide the actual timer value that should be used.

D. Structure of a Response Packet

Figure 6:
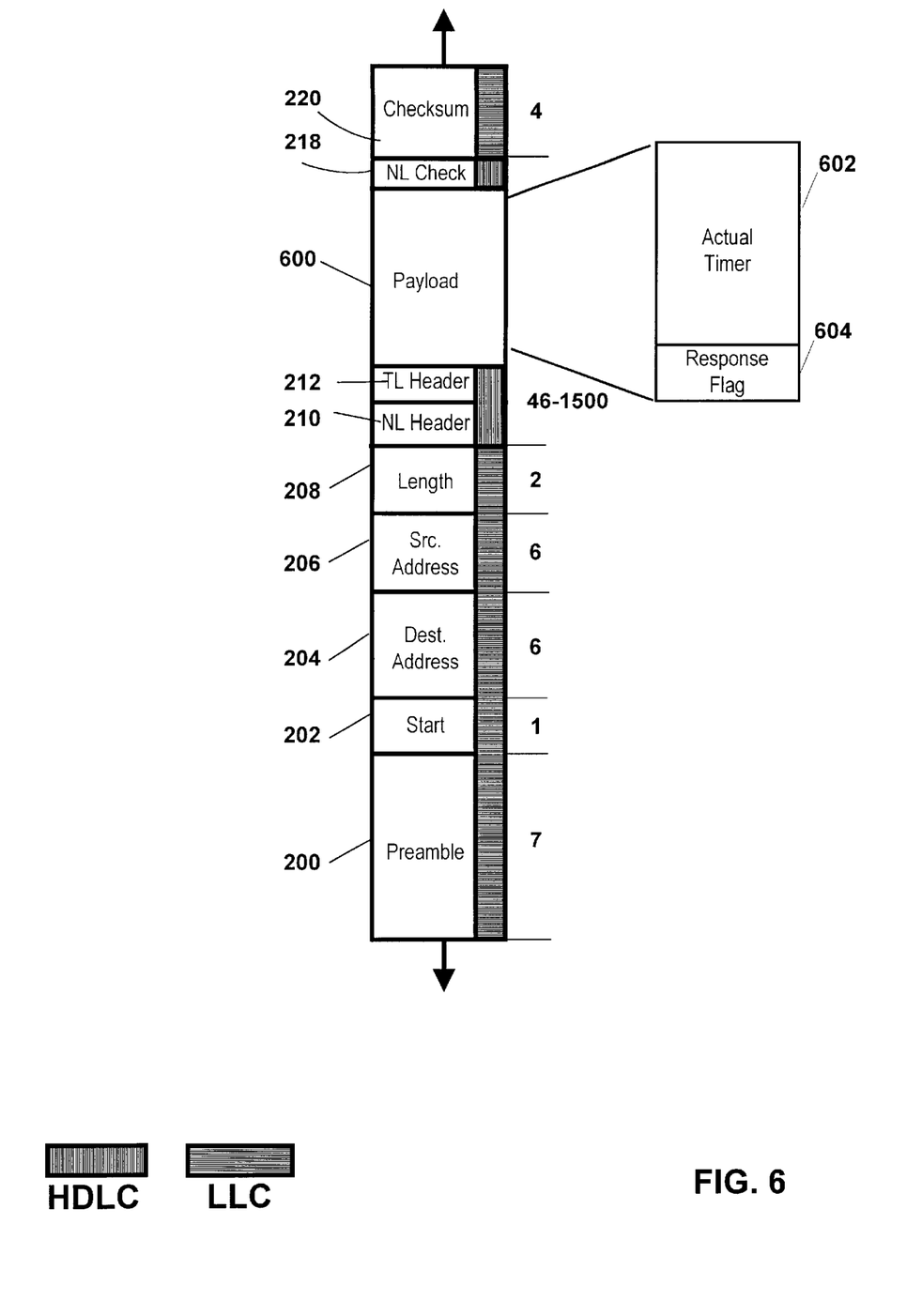
FIG. 6 is a diagram of an example response packet.

FIG. 6 is a diagram of an example response packet. This could be used as the response packets 316–318.

FIG. 6 shows the configuration of the response packet for an IEEE 802.3 packet-based network. Other configurations could be used on other types of packet-based networks. In one embodiment, the probe packet could be broadcast over the packet-based network.

The structure of the response packet is similar to the structure of the IEEE 802.3 packet shown in FIG. 2. However, the payload 216 is replaced with a response payload 600. The response payload 600 includes a response flag 604 and an actual timer 602. The response flag 504 is a predetermined sequence of one or more bytes designating that the packet is a response packet. Additionally, the transport layer header component 212 can designate a predetermined port which is used for receiving response packets. By designating a particular port, the chances that a normal packet would be mistaken for a response packet can be further reduced.

The actual timer 604 indicates the actual timer to be used. For example, the probe packet sent to a network device might indicate twenty milliseconds in the maximum timer 504. However, the response packet could respond with a lower actual timer. This might be based on network performance, quality of service factors, statistical performance factors, or other factors.

E. Structure of an Aggregate Packet

Figure 7:
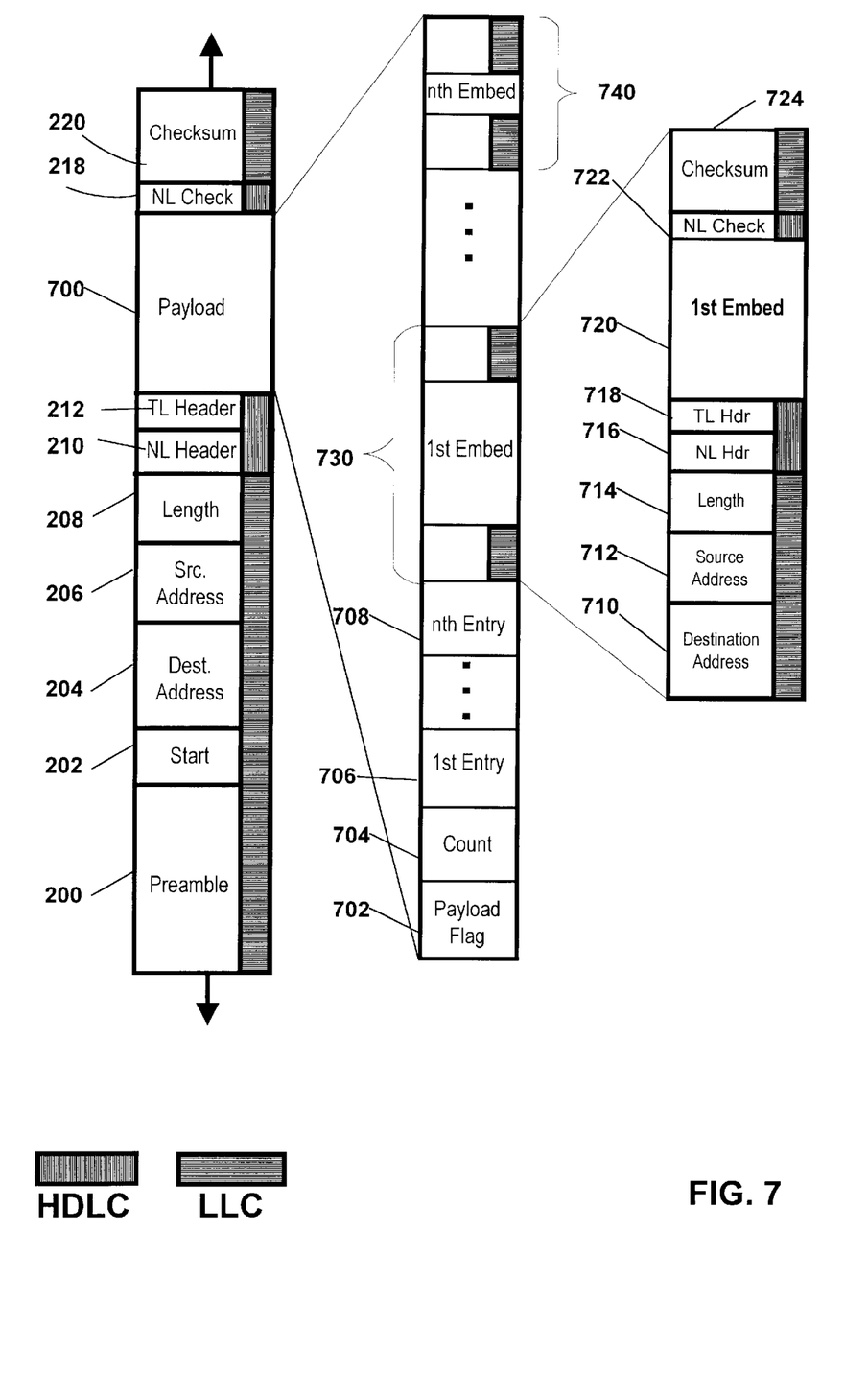
FIG. 7 is a diagram of an example aggregate packet.

FIG. 7 is a diagram of an example aggregate packet. This could be used as the aggregate packet 400.

FIG. 7 shows the configuration of the aggregate packet for an IEEE 802.3 packet-based network. Other configurations could be used on other types of packet-based networks.

The structure of the aggregate packet is similar to the structure of the IEEE 802.3 packet shown in FIG. 2. However, the payload 216 is replaced with an aggregate payload 700. The aggregate payload 700 includes a payload flag 702, a count 704, a first entry 706, an nth entry 708, a first embedded packet 730, and an nth embedded packet 740. The embedded packet 730–740 can be modified versions of the packets that were aggregated to form the aggregate packet.

The payload 702 is used to indicate that the payload 700 is an aggregate payload. Additionally, transport layer header components could designate a port or special address that would be used to reduce the probability that a normal packet would be misidentified as an aggregate packet.

The count 704 specifies how many packets are aggregated, or embedded, in the aggregate packet. In this example, the count 704 is n.

There is then one entry for each embedded packet, here that means there are n entries starting with the first entry 706 up to the nth entry 708. The entries specify the location and size of the embedded packets within the payload. In one embodiment, an offset from the start of the payload and the length of the embedded packet comprise the entries.

In one embodiment, the aggregate packet format omits the count 704 and the entries 706–708 are replaced with a fixed size table capable of holding at most i entries, e.g. i=4. In this embodiment, the payload flag 702 is followed by a fixed size table with entries for i embedded packets. The information in the table entries might be the same as the information in the entries 706–708.

The embedded packets 730–740 can be the entire packets including all of the LLC components for both all of the packets. However, many packet-based networks use LLC components that are identical across all packets and could be removed to decrease overhead and increase the amount of space available for embedded packets in the aggregate payload 700. In this example, the preamble and the start LLC components of the embedded packet 730 have been removed. The embedded packets 730–740 could be modified versions of the packets 318–324.

In this example, the embedded packet 730 includes a LLC destination address 710, a LLC source address 712, a length 714, a HDLC network layer header 716, a HDLC transport layer header 718, a first embedded payload 720, a HDLC network layer checksum 722, and a LLC checksum 724.

In one embodiment, the LLC destination address 710 and the LLC source address 712 are removed from the embedded packet as well. In this embodiment, all of the embedded packets in the aggregate packet must originate from the same source and have the same destination. In this embodiment, the payload flag 702 can indicate that the LLC addressing information must be recreated. Alternatively, the entries 706–708 can include information indicating that only certain packets in the embedded packets 730–740 need to have the LLC addressing information recreated.

F. Multimedia Terminal With Software Aggregation

In one embodiment, a software program can support the packet aggregation and de-aggregation techniques. This may be used in an H.323 multimedia terminal where multiple packetized streams of data are continuously generated or it may be used as software for a router. The computer program can be embodied in a computer data signal on a carrier wave or on a computer readable medium such as a CD-ROM, a DVD-ROM, or a floppy disk.

In a H.323 multimedia terminal, four separate streams of packets flow in each direction: video, audio, data and control. The video and audio packets are the most regular with one of each at regular intervals. The software or hardware supporting the H.323 multimedia conference on the multimedia terminal can be adapted to detect if the receiving terminal supports aggregate packets using the probe/response process described. Once it is determined that the remote terminal supports aggregate packets, the software or hardware can pre-package the video and audio packets into aggregate packets. This can be done by delaying the transmission of either the audio or the video packets slightly so that the packets can always be transmitted as part of an aggregate packet with the other type of packet.

This technique is also applicable to other types of streaming data applications or in other settings where a large amount of data is being sent to a common destination. For example, the interactions between web servers and web browsers may comprise many small packets with similar addresses. Packet aggregation would allow the transmission time between the server and client to be used more effectively.

G. Conclusion

Thus, a method and apparatus for creating and transmitting aggregate packets has been described. Included are methods for determining whether or not network devices support aggregate packets and packet structures for the aggregate packet, the probe packets and the response packets.

Embodiments of the invention can improve the amount of transmission time used in the network by transmitting a greater number of packets of larger sizes. These embodiments can reduce the delay inherent in transmitting multiple streams of packets, such as video and/or audio packets by combining the packets, into an aggregate packet that can be transmitted in a single transmission.

The foregoing descriptions of various embodiments of the invention have been presented for purposes of illustration and description. It is not intended to limit the invention to the precise forms disclosed. Many modifications and equivalent arrangements will be apparent.

What is claimed is:

1. A method for creating an aggregate packet in a packet-based network, the method comprising:
   receiving a first packet over the packet based network;
   determining whether a first route supports aggregate packets, the first route corresponding to a first sequence of destinations, the first sequence of destinations including a first final destination;
   beginning to wait a predeternmined period for at least a second packet, the second packet having a second route corresponding to a second sequence of destinations, the second sequence of destinations including a second final destination, the second route having at least one destination in common with the first route, the at least one common destination supporting aggregate packets;
   sending the first packet to the first final destination using the first route if the predetermined period expires before receiving the second packet; and
   creating an aggregate packet including the first packet and the second packet if the second packet is received before the predetermined period expires.

2. The method of claim 1, wherein the first packet is a packet compliant with a standard H.323 audio packet and wherein the second packet is a packet compliant with a standard H.323 video packet.

3. The method of claim 1, further comprising sending a plurality of probe packets to the first sequence of destinations corresponding to the first route, each of the plurality of probe packets corresponding to a request for a reply from respective destinations supporting aggregate packets.

4. The mnethod of claim 1, further comprising:
   continuing to wait for the predetermined period after the receipt of the second packet for a third packet having a third route corresponding to a third sequence of destinations, the third sequence of destinations including a third final destination, the third route having at least one destination in common with the first route and the second route, the at least one destination supporting aggregate packets,
   sending the aggregate packet including the first packet and the second packet if the predetermined period expires before receiving the third packet; and
   including the third packet in the aggregate packet if the third packet is received before the predetermined period expires.

5. The method of claim 1, wherein the creating further comprises including in the aggregate packet a first location and a first size for the first packet and a second location and a second size for the second packet.

6. The method of claim 1, wherein the aggregate packet includes an entry for each packet that is included in the aggregate packet, each entry defining a location and a size of a respective included packet.

7. The method of claim 1, wherein the packet-based network comprises an Ethernet network.

8. The method of claim 1, wherein the packet-based network comprises an Internet network.

9. The method of claim 1, wherein the packet-base network comprises a wide area network (WAN).

10. The method of claim 1, wherein the packet-based network comprises a local area network (LAN).

11. The method of claim 1, wherein the packet-based network comprises a wireless network.

12. The method of claim 1, wherein the packet-based network comprises a home network.

13. The method of claim 1, wherein the packet based network supports at least one or more of a stadard "Institute of Electrical and Electronics Engineers" (IEEE) 802 protocol, a stand IEEE 802.3 protocol, a standard IEEE 802.3u protocol, and a standard IEEE 802.3z protocol.

14. The method of claim 1, wherein the first route supports aggregate packets if at least one destination in the first sequence of destinations supports aggregate packets.

15. The method of claim 1, wherein a timer is used to test the predeteed period.

16. The method of claim 1, wherein a table is used to determine the predetermined period, the table comprised of a plurality of entries, the entries indicating predetermined periods for respective network devices.

17. The method of claim 1, wherein the aggregate packet comprises a packet compliant with the protocol of the packet-based network.

18. The method of claim 1, wherein the aggregate packet includes a flag in high level data link control information (HDLC) to designate that the packet comprises an aggregate packet.

19. The method of claim 1, wherein the aggegate packet includes a payload comprising a header followed by a plurality of packets.

20. The method of claim 19, wherein the header indicates the number of packets in the aggregate packet and the locations of the packets in the aggregate packet inside the plurality of packets.

21. The method of claim 20, wherein the plurality of packets includes the first packet and the second packet.

22. The method of claim 20, wherein the plurality of packets includes the number of packets indicated by the header.

23. The method of claim 20, wherein the packets in the plurality of packets include a link layer control (LLC) information.

24. The method of claim 23, wherein the LLC information is stripped of a one or more elements.

25. The method of claim 23, wherein the plurality of packets comprise IEEE 802.3 packets with LLC information stripped of a preamble component and a start component.

26. The method of claim 20, wherein the packets in the plurality of packets include a HDLC information.

27. The method of claim 1, wherein the aggregate packet includes a HDLC information, and wherein the HDLC information further includes a flag specifying the aggregate packet comprises at least a first packet and a second packet.

28. The method of claim 1, wherein the destination of the aggregate packet is the at least one common destination.

29. The method of claim 28, wherein the at least one common destination that is the destination of the aggregate packet is the common destination that is the farthest from the source of the first packet and the second packet.

30. An apparatus for creating an aggregate packet in a packet-based network, the apparatus comprising:

means for receiving a first packet over the packet based network;

means for determining whether a first route supports aggegate packets, the first route corresponding to a first sequence of destinations, the first sequence of destinations including a first final destination;

means for waiting a predetermined period for a second packet, the second packet having a second route corresponding to a second sequence of destinations, the second sequence of destinations including a second final destination, the second route having at least one destination in common with the first route, the at least one destination supporting aggregate packets;

meams for sending the first packet to the destination using the route if the predetermined period expires before receiving the second packet; and means for creating an aggregate packet including the first packet and the second packet if the second packet is received before the predetermined period expires.

31. A method for routing aggegate packets, the method comprising:

receiving a first packet, the first packet having a first route corresponding to a first sequence of destinations, the first sequence of destinations including a first final destination;

receiving a second packet within a predetermined period of receiving the first packet, the second packet having a second route corresponding to a second sequence of destinations, the second sequence of destinations including a second final destination;

aggregating the first packet with the second packet to create an aggregate packet to be sent to a first destination, the first destination in the first sequence of destinations and in the second sequence of destinations, the first destination supporting aggegate packets;

sending the aggregate packet to the first destination;

deaggregating the aggregate packet at the first destination into the first packet and the second packet;

sending the first packet to the first final destination from the first destination; and sending the second packet to the second final destination from the first destination.

32. A method of creating an aggregate packet, the method comprising:

receiving a first packet, the first packet having a first sequence of destinations, the first sequence of destinations including a first final desination, the first packet having a first protocol;

waiting a predetermined period for at least a second packet, the second packet having a second sequence of destinations, the second sequence of destinations including a second final destination, the second packet having a second protocol;

making a first determination that the first sequence of destinations and the second sequence of destinations have at least one destination in common;

making a second deterination that the first packet and the second packet combined can be accommodated in a single packet having the same protocol as the first packet; and combining the first packet and the second packet into a single aggregate packet in response to the first determination and the second determination, the aggregate packet having a destination that is the at least one common destination, and the aggregate packet having the same protocol as the first packet or the second packet.

33. The method of claim 32, wherein the first protocol and the second protocol are the same.

34. The method of claim 33, wherein the first protocol and the second protocol are Ethernet protocols.

* * * * *